US006986431B2

(12) United States Patent
Koester et al.

(10) Patent No.: US 6,986,431 B2
(45) Date of Patent: Jan. 17, 2006

(54) TRANSPORTATION AND STORAGE CART

(75) Inventors: Gary A. Koester, Defiance, OH (US); Randel C. Wise, Cecil, OH (US); Richard D. Stollsteimer, Van Wert, OH (US); Mark E. Tyrrell, Defiance, OH (US)

(73) Assignee: Koester Metals, Inc., Defiance, OH (US)

( * ) Notice: Subject to any disclaimer, the term of this patent is extended or adjusted under 35 U.S.C. 154(b) by 0 days.

(21) Appl. No.: 10/323,587

(22) Filed: Dec. 18, 2002

(65) Prior Publication Data

US 2003/0121874 A1 Jul. 3, 2003

Related U.S. Application Data

(60) Provisional application No. 60/344,090, filed on Dec. 19, 2001.

(51) Int. Cl.
*A47F 5/00* (2006.01)

(52) U.S. Cl. ...................................... 211/187; 211/184

(58) Field of Classification Search ................ 211/184, 211/187, 43, 41.1, 41.14; 108/61
See application file for complete search history.

(56) References Cited

U.S. PATENT DOCUMENTS

| | | | | | |
|---|---|---|---|---|---|
| 299,602 | A | * | 6/1884 | Ward | 211/184 |
| 1,046,488 | A | * | 12/1912 | Pauley | 211/184 |
| 1,272,175 | A | | 7/1918 | Albright | |
| 1,272,207 | A | * | 7/1918 | Bullen | 211/184 |
| 2,338,290 | A | | 1/1944 | McDonald | |
| 2,702,127 | A | | 2/1955 | Pastorius, III et al. | |
| 3,199,683 | A | | 8/1965 | Graswich | |
| 3,349,924 | A | | 10/1967 | Maurer et al. | |
| 3,408,128 | A | * | 10/1968 | Kump | 211/184 |
| 3,630,387 | A | | 12/1971 | Wehner | |
| 3,744,866 | A | * | 7/1973 | Cook | 211/59.2 |
| 3,939,986 | A | * | 2/1976 | Pierro | 211/74 |
| 4,022,326 | A | * | 5/1977 | Marconi | 211/41.17 |
| 4,343,450 | A | * | 8/1982 | Anderson | 248/454 |
| 5,127,340 | A | * | 7/1992 | Maro et al. | 211/187 |
| 5,474,412 | A | * | 12/1995 | Pfeiffer et al. | 211/187 |
| 5,924,577 | A | | 7/1999 | Gessert | |
| 6,116,436 | A | * | 9/2000 | Ferrucci et al. | 211/187 |
| 6,460,710 | B1 | * | 10/2002 | Dardashti | 211/184 |
| 6,685,037 | B1 | * | 2/2004 | Zadak | 211/184 |

OTHER PUBLICATIONS

Global Industrial Equipment, Winter 2002 Catalog cover and pp. 6, 7, 20, 23, 130, 131, 133 and 135.

C & H Distributors, Inc., More Solutions. More Service More Value., Sep.-Dec. 2002 Catalog cover and pp. 222, 223, 230, 231 and 257.

C & H Distributors, Inc., We Deliver More Service, Undated Catalog cover and pp. 225 and 229.

Terminal Steel & Equipment Co., Sep. 2001 brochure cover and p. 16.

Koch Supplies, Prices Good Thru Feb. 28, 2002 catalog cover and pp. 37, 39 and 41.

(Continued)

*Primary Examiner*—Alvin Chin-Shue
(74) *Attorney, Agent, or Firm*—Emch, Schaffer, Schaub & Porcello, Co., L.P.A.

(57) ABSTRACT

A storage and transportation cart having shelves and guide blocks adjustable along three axes to accommodate parts and workpieces of differing shapes and sizes and retain those workpieces in a vertical orientation.

23 Claims, 12 Drawing Sheets

OTHER PUBLICATIONS

Material Handling Product News, Aug. 2002, vol. 23, No. 13, Periodical cover and pp. 8, 12, 17 and unnumbered advertising page including shelf racks.
Material Handling Product News, Sep. 2002, vol. 24, No. 1, Periodical cover and p. 8.
Material Handling Product News, Oct. 2002, vol. 24, No. 3, Periodical cover and p. 21.
Ien Industrial Equipment News, Oct. 2002 brochure cover and second page, unnumbered.
Samson Collapsible 6-Shelf Utility Carts, promotion flier relating to Booth #C 2959 at PROMAT 2003 in Chicago.
Material Handing System for Continuous Improvement brochure by CREFORM material Handling System, promotion flier, undated, 2 pages.
Point2point Flexible, Mobile Part Protection, New From Point2pointsolutions, Promotional flier relating to Booth 2301 at PROMAT 2003 in Chicago, Feb. 10-13, 2003, 3 pages.
Western Electric Transporter Truck for Printed Wiring Board, by W.J. Edwards, R. P. Wicker, Richmond, excerpt from Technical Digest No. 56, Oct. 1979, pp. 11 and 12.

* cited by examiner

TRANSPORTATION AND STORAGE CART

This application claims the benefit of Provisional Application No. 60/344,090, filed Dec. 19, 2001.

The invention is directed toward a transportation and storage cart and more specifically toward a flexible in-process or transportable material handler adjustable to store and transport a wide variety of sizes and quantities of articles. The cart is designed to protect the articles during transportation and storage to reduce the chance of damage to the parts.

BACKGROUND OF THE INVENTION

The manufacture, transportation and storage of substantially planar articles such as those manufactured from sheet metal, plastic, glass or wood many times necessitates a cart which can be used for storage of the sheet metal, plastic glass or wooden articles as well the secure transportation of those articles between manufacturing sites or from manufacturer to customer or subcontracting user. Specifically, many carts are designated to protect paint and surface finishes of individual articles during storage and transportation and many times it is desired that, during storage and transport, the articles be placed in a vertical position.

Numerous patents are directed toward varying embodiments of such carts. For instance, U.S. Pat. No. 5,924,577 discloses a modular rack and storage system for storing planar articles such as screen stencils, silk screens and the like. The rack unit includes a plurality of channels mounted in opposing pairs which serve as upper and lower guides on supports for retaining the planar article. Other patents, for instance, U.S. Pat. No. 2,338,290 show the use of a vertical storage unit for storing things such as trays and plates. All known rack and storage units for storing workpieces or articles in the vertical position involve opposed sets of rails specifically designed to the dimensions of the article being manufactured and stored. The opposed racks separate the articles to prevent damage to the articles during storage and transportation. See for example, U.S. Pat. Nos. 2,702,127, 3,199,683, and 3,349,924.

The known art, however has a specific deficiency when faced with the necessity of manufacturing and storing articles of various shapes, sizes and dimensions.

Thus, there is a need for a storage and transportation cart that is adaptable to store and transport multiple parts in one cart.

There is also a need for a storage and transportation cart that securely holds multiple parts vertically in place from side to side and securely locks the parts in place for transportation.

There is a further need for a storage and transportation cart which is adaptable to be used as a refillable or recyclable cart capable of adapting to varying sizes of workpieces and articles.

SUMMARY OF THE INVENTION

The present invention meets the identified needs by providing a storage and transportation cart having dimensional variability along three axes. The cart is constructed of four rigid corner posts fixed between a rigid base member and a rigid roof member. A plurality of shelves, at least two, are adjustably positioned within the four corner posts. The shelves are adjustable vertically or along a first axis on the corner posts to accommodate a variety of articles of differing heights. The upper and lower shelves include opposing assemblies with adjustable upper and lower guide blocks placed in opposition to each other. The guide blocks are adjustable in their horizontal spacing or along a second axis across the upper and lower shelves to provide adaptability of the cart to storing and retaining articles of varying widths. Finally, an adjustable rear stop assembly, movable along a third axis, is provided to accommodate workpieces and articles of various lengths.

The transfer cart of the present invention is adaptable to store a variety of parts having dimensional variations along three axes.

Further features include casters placed on the bottom of the cart for easy movement of the cart and a pedal brake for locking the cart in position when desired.

The storage and transfer cart of the present invention can be sized to accommodate articles of a specific size but is adjustable along three axes to fit any smaller or larger size and quantity. The cart can be configured to handle multiple parts of different sizes and shapes in the same cart for transportation and storage. Optional items such as extra shelves for accommodating more than one layer of parts, extra guides and dividers, pneumatic tires, fork lift tubes and an optional heavy duty tube construction of the frame may be alternatively incorporated into the cart of the present invention to meet varying needs.

Additional advantages of the present invention will become apparent from the following description of the preferred embodiment.

DESCRIPTION OF THE PREFERRED EMBODIMENT

Figure 1:
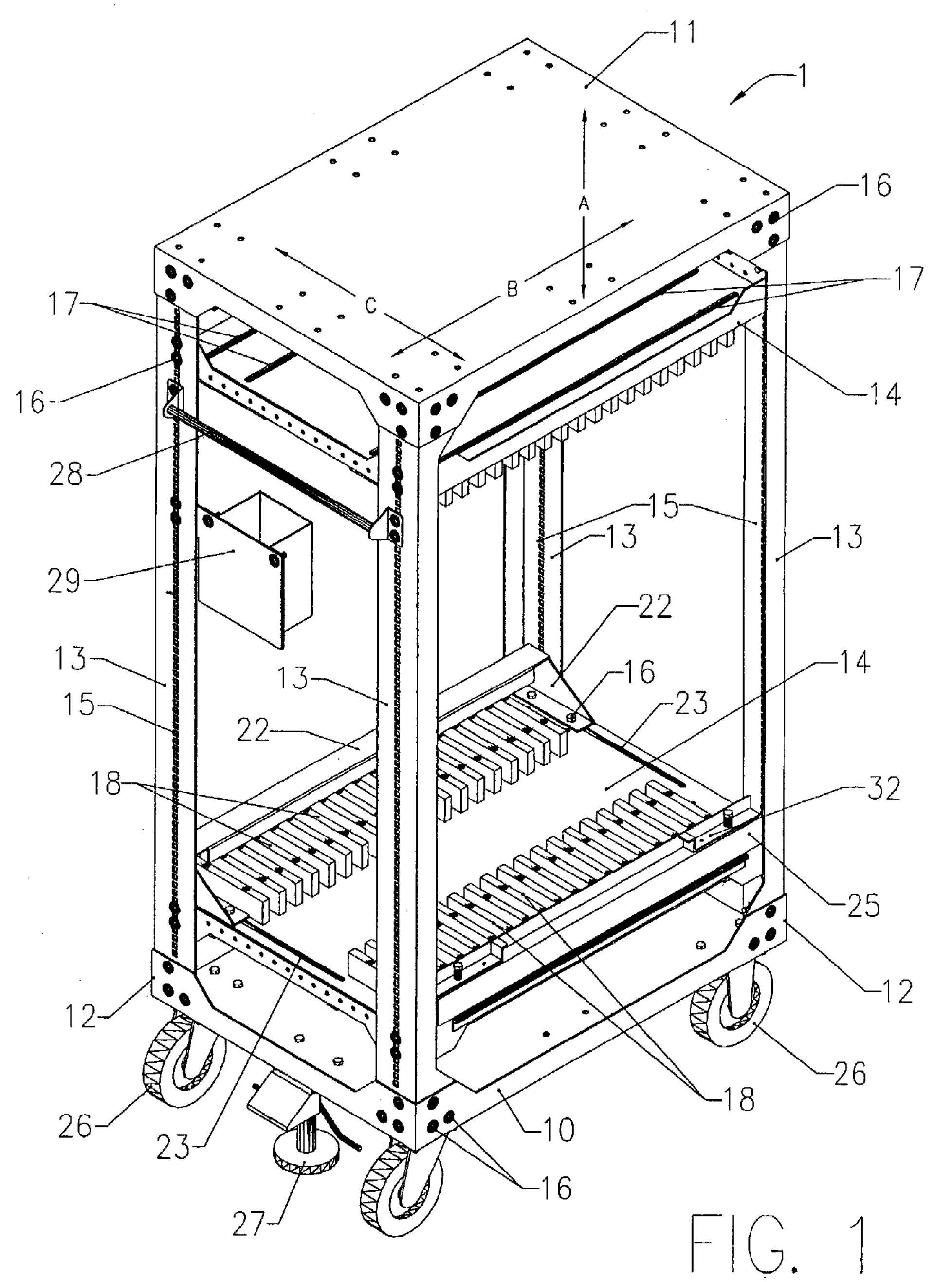
FIG. 1 is a perspective view of the storage and transfer cart of the present invention.

Referring to FIG. 1, the storage and transfer cart 1 of the present invention preferably is constructed of a base member 10 and a roof member 11. The base member 10 and roof member 11 are preferably formed identically so as to be interchangeable. The base member 10 and roof member 11 each have a flat planar surface and four sides preferably upraised from the surface which meet to form four rigid corners 12. The base member 10 and roof member 11 are spaced from one another in the vertical direction and corner posts 13 are rigidly fixed to the corners 12. The corner posts 13 and the base member 10 and roof member 11 are preferably interjoined by a removable connector assembly such as a nut and bolt 16 combination. In particular, a carriage bolt works particularly well to interjoint these components. However if desired, the members may be joined in a fixed manner such as welding. Also, if desired, solid side panels can be affixed to the cart to provide additional protection for the articles positioned on the cart.

In the preferred embodiment, the corner posts 13 are of an angle configuration allowing for the placement of a plurality of shelf assemblies 14 within the interior angle of the corner posts 13. Thus, the shelf assemblies 14 can use the interior angle of the corner post 13 as alignment guides. The corner posts 13 include a plurality of stops 15 which extend in even spacing the full length of the corner posts 13. In the preferred embodiment, the shelf assemblies 14 are secured to the corner posts 13 by removable assemblies such as nut and bolt combinations 16 which extend through the holes or stops 15 of the corner posts and support the shelf assemblies 14. In particular, carriage bolts are particularly effective in securing the shelf assemblies to the corner posts. Thus, the shelf assemblies 14 are adjustable along a first vertical axis A to accommodate workpieces and articles of varying heights.

It is envisioned that any number of opposing shelf assemblies 14 may be positioned within the corner posts 13 to provide more than one layer of article or workpiece storage within the cart.

Each shelf assembly 14 has a plurality of locating devices to secure guide members 18 that are used to locate the articles that are stored on the transfer cart. A plurality of slots 17 is one example of a suitable locating device for the guide members. When such slots are utilized, each shelf assembly 14 is designed to have a plurality of spaced and parallel slots 17 extending horizontally along a second axis B. The slots 17 are spaced to receive and retain the guide members 18. Preferably, a plurality of guide members 18 is positioned in desired spatial relationship on opposing shelf assemblies 14 to match the dimensions of the articles to be stored. The spacing between the guide members 18 is adjustable along the slots 17 to provide variability in spacing for material handling along the second axis B. Preferably each guide member 18 is constructed of a plastic material such as delrin, acetyl, or nylon. However, it should be understood that other materials can be used for the guide members 18 to provide the needed characteristics to locate the articles that are stored on the transfer cart. In some applications, an ultra high molecular weight plastic has been found to work well for the guide members 18. Such guide members are easily molded, can be quickly installed and moved on the shelf assemblies, and can be configured to accommodate articles of many sizes and shapes.

To provide adjustability along the third axis C, at least one rear stop assembly 22 is attached to the shelf assemblies 14. Slots 23 oriented along the third axis C, provide adjustability for the rear stop assembly 22 in the third axial C direction. The stop assembly 22 is positioned in the slots 23 by known means such as nut and bolt combinations 16. The stop assembly 22 can be positioned on opposed shelf assemblies 14 to provide added security for the article stored and transported on the cart. Thus, the storage and transfer cart of the present invention is adjustable along three axes to meet the variation in shapes and sizes of articles to be stored on the cart.

The preferred embodiment of the cart further includes a hinged retaining gate 25 positioned across the guide members 18 in opposition to the rear stop assembly 22. The hinged retaining gate 25 may be folded away from the guide members 18 to allow the articles to be slid into or out of the spaces defined by the guide members 18 and returned to an upright position after the workpieces are placed into the cart to secure the workpieces in position within the cart and prevent spillage during transport. A spring loaded retaining latch mechanism 32 is positioned on the retaining gate 25. The latch mechanism releasably engages the corner posts 13 so that the retaining gate 25 is secured in the upright position to secure the articles in the transfer cart. A retaining gate 25 can be positioned on each opposed shelf assembly 14 to further assist in retaining articles in position during transportation. In addition, retaining gate 25 can be positioned on each side of the shelf assembly 14 across the guide members 18 wherein the retaining gate 25 would replace the stop assembly 22 on one end of shelf assembly 14. The stop assembly 22 can also be positioned on the shelf assembly 14 wherein the stop assembly functions as a stop for articles inserted from both sides of the transfer cart. This configuration allows articles having different sizes to be positioned on the cart or for articles of substantially the same size to be inserted from both sides of the cart to increase the handling capacity of the cart for such articles.

The guide members, stop assembly and retaining gate are all designed to position and retain the articles on the cart in a manner that protects the articles. The surfaces of the guide members, stop assembly and retaining gate that come into contact with the articles are designed to reduce the possibility that the articles will be damaged when transported or stored on the cart. Further, the guide member, stop assembly and retaining gate are designed to be adjustable in position so that these components reduce movement of the articles once the articles are properly positioned and secured on the cart.

The cart assembly further includes a plurality of caster members 26, preferably four, two of which swivel and two of which are fixed, to assist in ease of transportation. A pedal brake 27 is provided to secure the storage and transportation cart in a fixed position when desired. It is also possible to stack a cart assembly on top of another cart assembly to expand the storage and transporting capability. Obviously, in such a stacked arrangement, the top cart assembly would not include the casters 26. Instead, the base member 10 of the upper cart assembly would be positioned on the roof assembly 11 of the lower cart assembly.

The preferred embodiment of the cart further includes a handle 28 to assist in pushing and/or pulling the cart. The handle 28 is adjustably fixed by removable assemblies such as nuts and bolts to the stops 15 on the corner posts 13.

Further, a document pocket 29 can be provided between the upper shelf assembly 14 and the roof 11.

If the cart is intended for use with particularly heavy objects, alternative assemblies may include the use of pneumatic tires in replacement of the caster assemblies and/or a fork tube construction for the frame to provide strength and rigidity to support the heavy objects.

Figure 3:
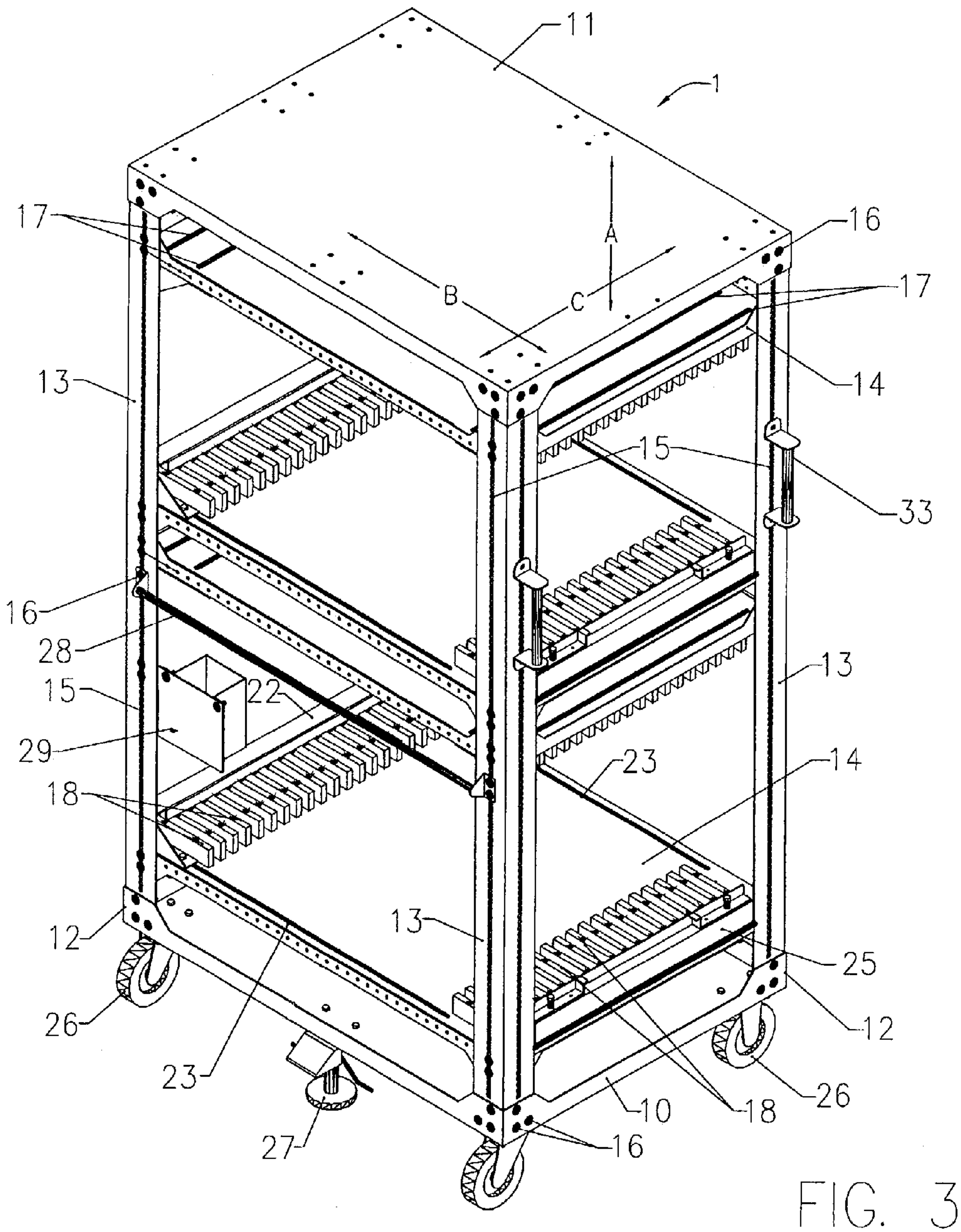
FIG. 3 is a perspective view of the cart of the present invention.

An alternative embodiment of the cart assembly can provide the guide members 18 to be oriented along the third axis C to provide an optional end loading version of the cart as shown in FIG. 3. In this alternative shelf assemblies 14, will have slots 17 and slots 23 will be positioned in axis C and B respectively, 90 degrees from the preferred embodiment. In this alternative embodiment guide members 18, stop assembly 22, and retaining gate 25 are positioned 90 degrees from the preferred embodiment allowing for wider, but fewer parts to be carried by the cart. Also, the corner posts 13 used in the cart assembly 1 of FIG. 3 are symmetrical to facilitate placing parts in the cart assembly from either direction. Also, a vertically positioned handle 33 is positioned on each corner post 13. The handles 33 can be on any length that is desirable. The handles 33 can be positioned on the corner posts 13 wherever convenient to assist in moving the cart assembly. In addition, the handles 33 can also be used in combination with horizontal style handles 28.

Figure 2:
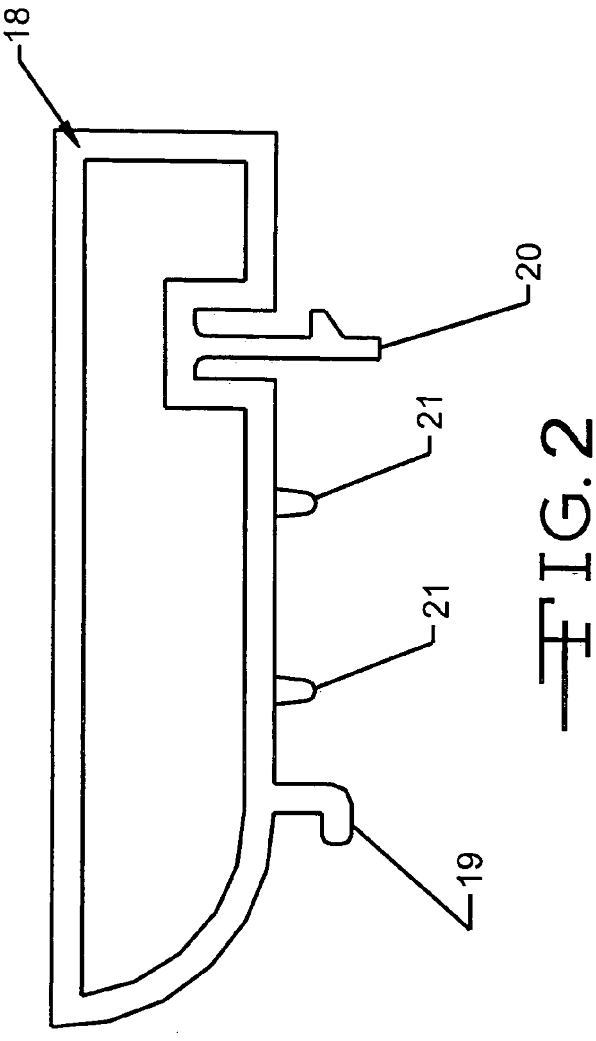
FIG. 2 is a side view of another molded plastic divider or guide assembly intended for use with the cart of FIG. 1.
Figure 2A:
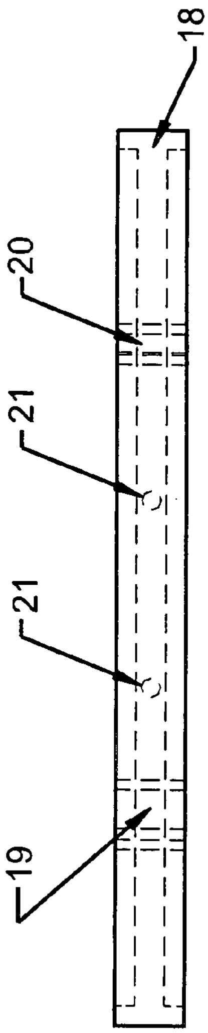
FIG. 2A is a top view of the divider shown in FIG. 2.

FIG. 2 shows another structure for a guide members 18 that is used to locate the articles that are stored on the transfer cart. Each shelf assembly 14 is designed to have a plurality of spaced and parallel slots 17 extending horizontally along a second axis B. The slots 17 are spaced to receive and retain the guide members 18 shown in FIG. 2. Each guide member 18 includes a retaining clip 19 and spring clip 20. The retaining clip 19 and spring clip 20 are specifically spaced to mate with the slots 17 located in the shelf assemblies 14. The retaining clips 19 and spring clip 20 allow the guide members 18 to be easily secured in and removed from the shelf assemblies 14 to accommodate various articles to be stored on the transfer cart.

If it is desirable to provide additional security for the positioning of the guide members 18, pins 21 can be utilized. The pins 21 are designed to engage holes in the shelf assembly that are located adjacent to the slots 17. For the guide member 18 shown in FIG. 2, the pins 21 and holes would be located between the slots 17. However, it should be recognized that the pins 21 and holes can be disposed in other locations to assist in positioning the guide members 18.

Preferably each guide member 18 is constructed of a plastic material such as delrin, acetyl or nylon. However, it should be understood that other materials could be used for the guide members 18 to provide the needed characteristics to locate the articles that are stored on the transfer cart. In some applications, an ultra high molecular weight plastic has been found to work well for the guide members 18. Such guide members are easily molded, can be quickly installed and moved on the shelf assemblies, and can be configured to accommodate articles of many sizes and shapes.

Figure 4:
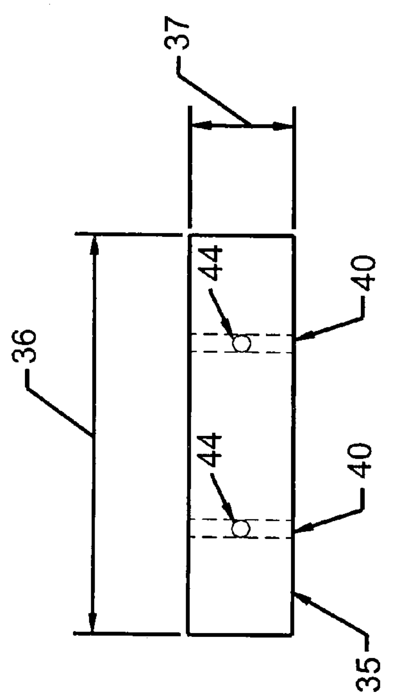
FIG. 4 is a front elevation view of a guide assembly intended for use with the cart of FIG. 1.
Figure 5:
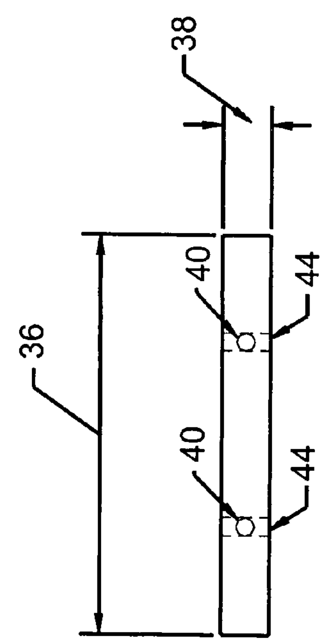
FIG. 5 is a plan view of the guide assembly of FIG. 4.
Figure 6:
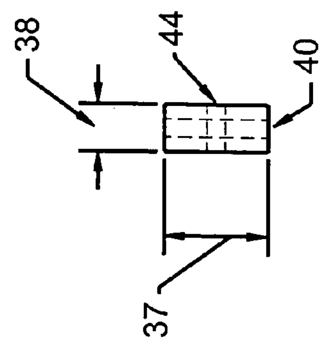
FIG. 6 is a side view of the guide assembly of FIG. 4.

FIGS. 4, 5 and 6 show the structure of a guide member 35 that can be used with the cart of the present invention. The guide members 35 are made of a rectangular piece of material having a length 36, a width 37 and a thickness 38. At least two spaced apart, substantially parallel holes 40 extend through the guide member 35 in the width direction. At least two spaced apart, substantially parallel holes 44 extend through the guide member 35 in the thickness direction. The holes 40 and the holes 44 are disposed so that they are spaced apart essentially in the same manner on the guide number 35 so that for every hole 40 there is a corresponding hole 44. The respective holes 40 and 44 are disposed so that the holes are oriented 90° apart and the holes intersect in the center of the guide member 35.

The guide members 35 are secured to the shelf assemblies to locate the articles that are stored and transported on the cart. The guide members 35 are secured to the shelf assemblies by removable connectors such as a nut and bolt. The bolts are positioned in holes 40 or holes 44 and then secured to the slots 17 on the shelf assemblies by a nut. The guide members 35 can be positioned on the shelf assemblies 14 in one of the two directions depending on the configuration of the articles positioned on the cart. If holes 40 are utilized to secure the guide member 35 to the shelf assemblies 14, the width dimension of the guide member 35 will extend from the shelf assembly between the articles and the articles will be separated by the thickness dimension of the guide member. This results in a relatively long and narrow guide member 35 being positioned between the articles. If the holes 44 are utilized to secure the guide members 35 to the shelf assemblies, the thickness dimension of the guide member will extend from the shelf assembly between the articles and the articles will be separated by the width dimension of the guide member. This results in a relatively wide and short guide member being positioned between the articles. Thus, the guide members 35 can be positioned in different orientations to accommodate different spacing requirements for the articles. In practice it has been found to be particularly useful if the guide members 35 have a width that is at least twice the thickness of the guide members. It is also possible that the width and thickness dimensions could be substantially the same and utilizing the different holes 40 or 44 would allow different surfaces to be positioned adjacent the articles and extend the life of the guide members 35. FIGS. 4, 5 and 6 show the structure of a guide member 35 that can be utilized with the cart of the present invention.

Figure 7:
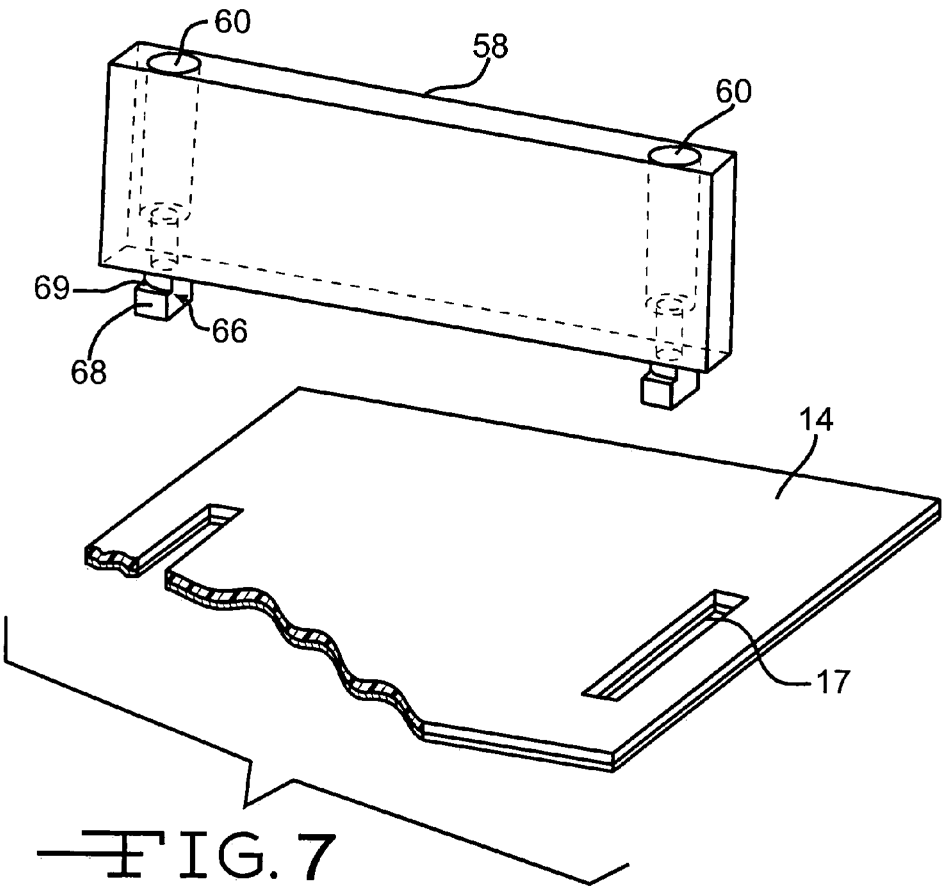
FIG. 7 is a perspective view of a guide member that can be used with the cart.
Figure 7A:
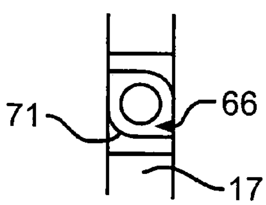
FIGS. 7A–7D is a bottom view of the locking nut used with the guide member of FIG. 7.
Figure 7B:
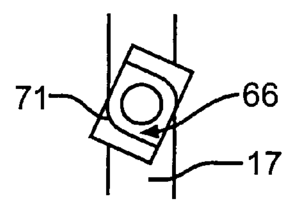
Figure 7C:
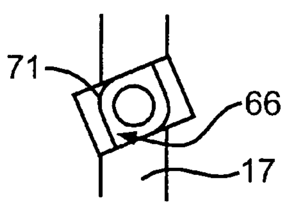
Figure 7D:
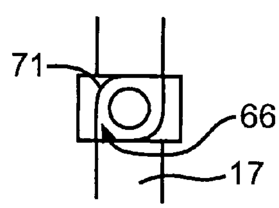
Figure 8:
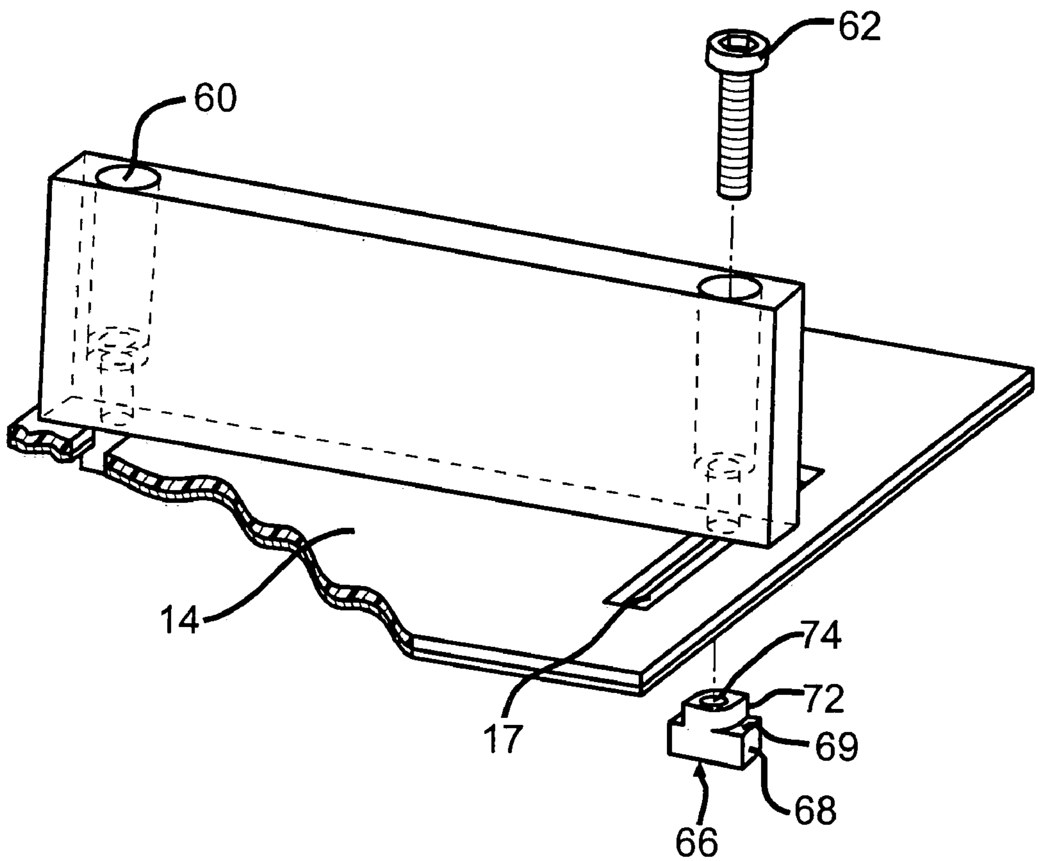
FIG. 8 is a perspective view of the guide member of FIG. 7.

FIGS. 7 and 8 show another configuration that can be used for guide members for the parts that are positioned on the shelf of the cart. The guide members 58 shown in FIG. 7 are essentially the same as the previously discussed guide member 18 and 35 except for the way in which the guide members 58 are secured to the shelf assembly 14. The guide members 58 have two spaced apart passageways 60 that are disposed to be in alignment with the slots 17 located in the shelf assembly 14. A threaded bolt 62 can be positioned in each passageway so that the threaded bolts extend into the slots 17. The threaded bolts 62 are utilized to secure a locking nut 66 that acts to position the guide member 58 with respect to the shelf assembly 14. The locking nut 66 has a foot 68 that define shoulders 69 and a neck 72 with a threaded passageway 74. The threaded passageway 74 is designed to threadingly engage the threaded bolt 62 to secure the bolt to the guide member 58. The foot 68 is designed to pass through the slots 17 in the shelf assembly 14 when in the orientation shown in FIG. 7 and to have the shoulder 69 engage the shelf assembly 14 when in the orientation shown in FIG. 8. In FIG. 8, the foot 68 has been rotated 90° from the position shown in FIG. 7. The neck 72 has a cam surface 71, as shown in FIGS. 7A–7D, that is designed to be in engagement with the slot 17 in the shelf assembly when the neck is in a particular orientation. When the neck 72 is in the orientation shown in FIG. 8, the cam surface 71, as is known in the art, wedges against the slot 17 and prevents further rotation of the locking nut 66 in a clockwise direction. Accordingly, the bolt 62 can be rotated to secure the locking nut 66 to the guide member 58 to securely position the guide member on the shelf assembly 14. When the bolt 62 is rotated in a counter clockwise direction, the cam surface 71 on the neck 72 allows the locking nut 66 to be rotated in a counter clockwise direction and be positioned in the orientation shown in FIG. 7 so that the guide member 58 can be placed in a different location on or removed from the shelf assembly 14.

Figure 9:
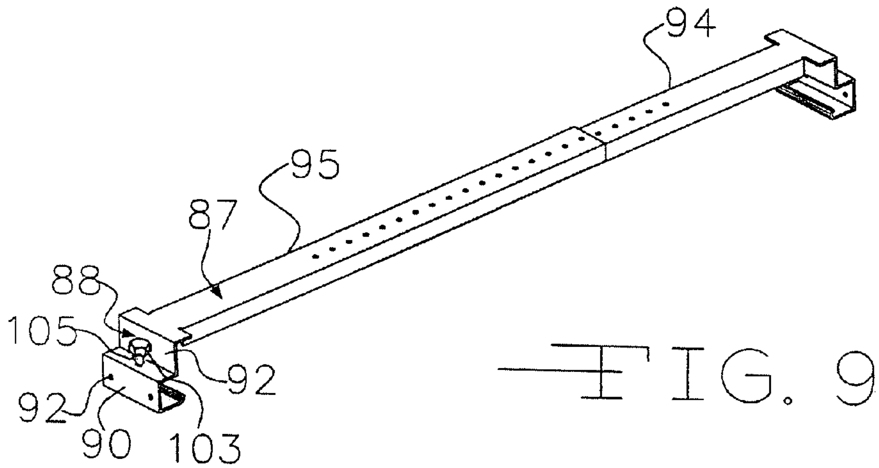
FIG. 9 is a perspective view of a stop assembly that can be used with the cart of the present invention.
Figure 10:
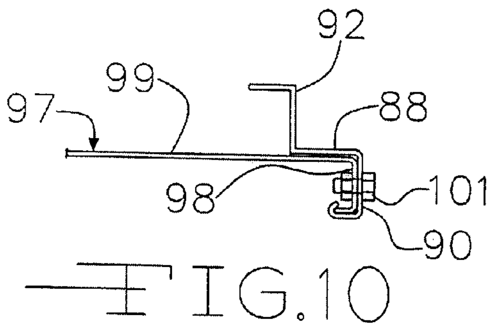
FIG. 10 is a partial side elevation view of the end bracket of the stop assembly of FIG. 9.
Figure 11:
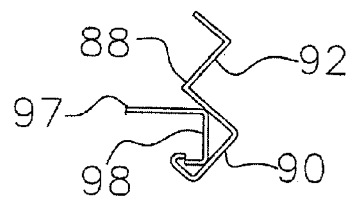
FIG. 11 is a partial side elevation view of the end bracket.
Figure 12:
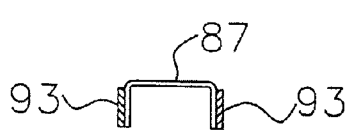
FIG. 12 is a partial cross sectional view of the stop assembly shown in FIG. 9.
Figure 14:
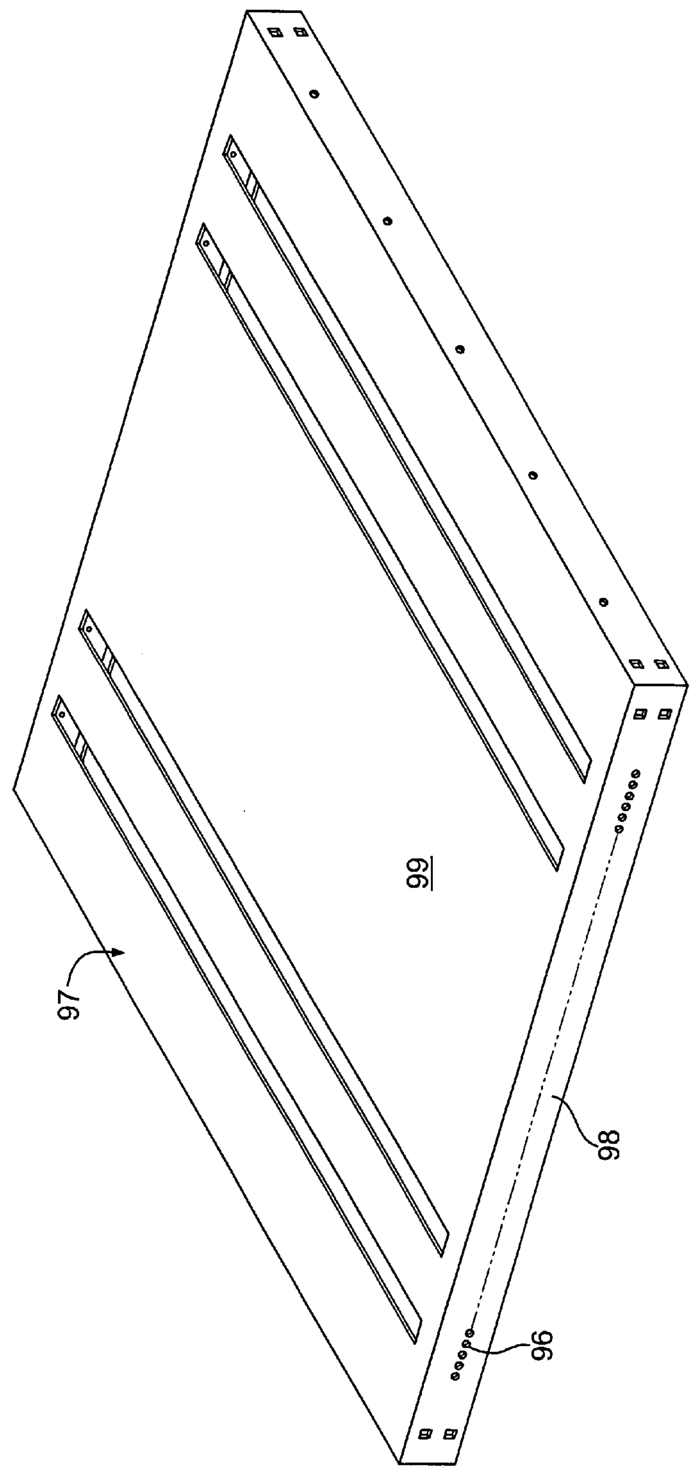
FIG. 14 is a perspective view of a shelf assembly that can be used with the cart.

FIGS. 9–12 show another type of stop assembly 87 that can be used with the cart of the present invention. The stop assembly 87 is for use with the shelf assembly 97 shown in FIG. 14. The stop assembly 87 has a pair of end brackets 88 that define a generally J-shaped channel 90 that is rotated to position the J-shaped channel around the end wall 98 of the shelf assembly 97. As shown in FIGS. 10–12, an L-shaped bracket 92 is secured to the J-shaped channel 90. The L-shaped bracket 92 extends in spaced apart relationship over the storage surface 99 of the shelf assembly 97, as shown in FIG. 10. In practice, it has been found to be preferable to have the J-shaped channel 90 and the L-shaped bracket 92 formed as one piece. A bolt and nut assembly 101 can be positioned in the holes 104 in the J-shaped channel 90 and the holes 96 in the end wall 98 of the shelf assembly 97, as shown in FIG. 10. The bolt and nut assembly 101 secures the end brackets 88 to the shelf assembly 97. A first stop member 94 extends from one L-shaped bracket 92 and a second stop member 95 extends from the other L-shaped bracket. The first and second stop members telescopingly mate to form a stop over the storage surface 99 of the shelf assembly 97. A securing means such as a nut and bolt assembly, a screw or spring biased pin can be utilized to secure the first and second stop members together. The telescoping feature for the stop members allows the stop assembly 87 to be used on shelf assemblies that have different widths. As shown in FIG. 12, a protective surface 93 can be positioned on the first and second stop members to protect objects that come into contact with the stop assembly 87. As shown in FIG. 9, a jack bolt 103 could be positioned in the aperture 105 in the J-shaped channel 90 to secure the J-shaped channel to the shelf assembly 97. The jack bolt 103 is advanced to contact the storage surface 99 of the shelf assembly 97 to releaseably secure the J-shaped channel 90 to the shelf assembly.

Figure 13:
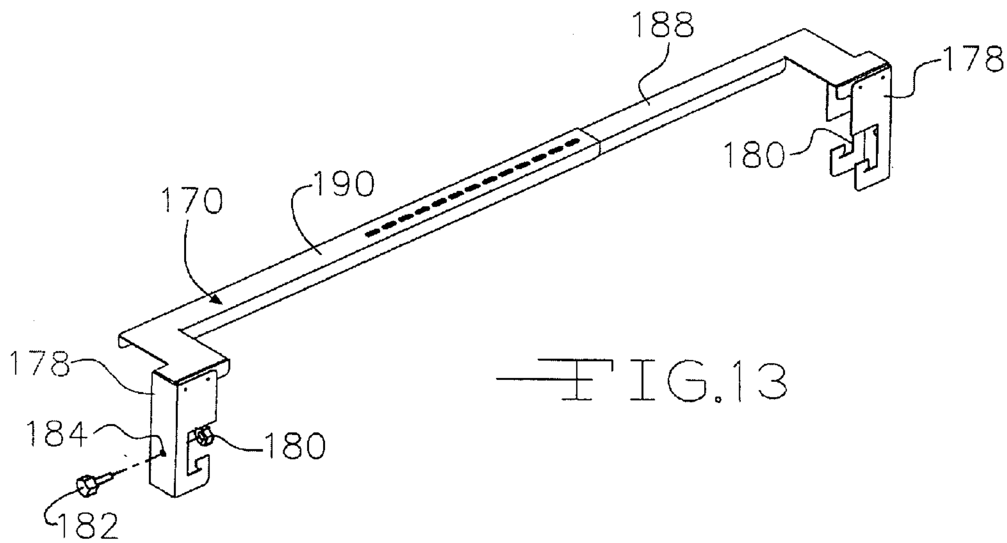
FIG. 13 is a perspective view of a stop assembly that can be used with the cart of the present invention.

FIG. 13 shows another stop assembly 170 that can be used with the cart of the present invention. The stop assembly has two end brackets 178 that are similar to the end brackets 88 previously described. The brackets 178 define a G-shaped channels 180 that are rotated in the manned previously described to fit around the end wall 98 of the shelf assembly 97 shown in FIG. 14. a nut and bolt assembly 182 can be positioned in the aperture 184 in the end bracket and one of the holes 96 in the shelf assembly 97 to secure the stop assembly to the shelf assembly. A first stop member 188 extends from one end bracket and a second stop member 190 extends from the other end bracket. The first and second stop members telescopingly mate to form a stop over the storage surface 99 on the shelf assembly 97. A securing means as previously described can be used to secure the first and second stop members together.

Figure 15:
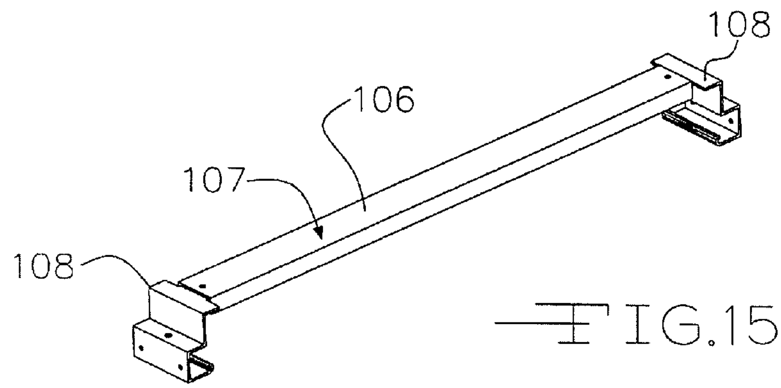
FIG. 15 is a perspective view of a stop assembly that can be used with the cart of the present invention.

FIG. 15 shows another stop assembly 107 that can be used with the cart of the present invention. The stop assembly has two end brackets 108 that are essentially the same as the end bracket 88 previously described. The stop assembly 107 secures to the shelf assembly 97 in the same manner and functions essentially the same as the previously described stop assembly 87. However, a one-piece stop member 106 is secured to each bracket 108 by an appropriate securing means such as welding or a nut and bolt assembly.

Figure 16:
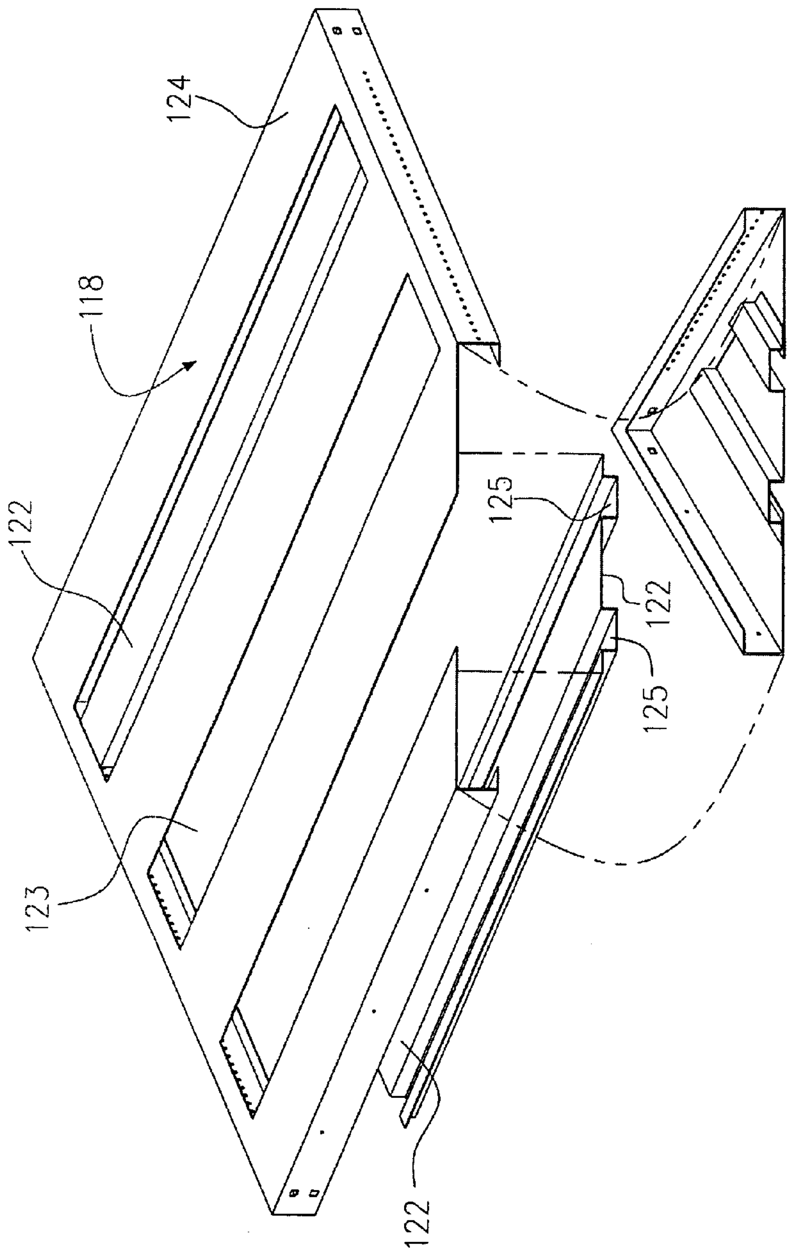
FIG. 16 is a perspective view of a shelf assembly that can be used with the cart of the present invention.

FIG. 16 shows another type of shelf assembly 118 that can be used with the cart of the present invention. The shelf assembly 118 is similar to the shelf assembly 97 previously described and shown in FIG. 14. However, the channels are formed in a different manner in this shelf assembly. An insert 122 is positioned in a cut out 123 in the article storing surface 124 of the shelf assembly 118. The insert 122 forms the channels 125 in the shelf assembly and can be a thicker or stronger material than is used for the rest of the article storing surface 124 of the shelf assembly 118. The insert 122 can be used to reinforce or strengthen the slot area of the shelf assembly. The insert 122 can be secured to the shelf assembly 118 by spot welding or a stud and nut fastening arrangement. The insert 122 provides an effective way to locally reinforce or strengthen the portion of the shelf assembly 118 that receives the most stress during use.

Figure 17:
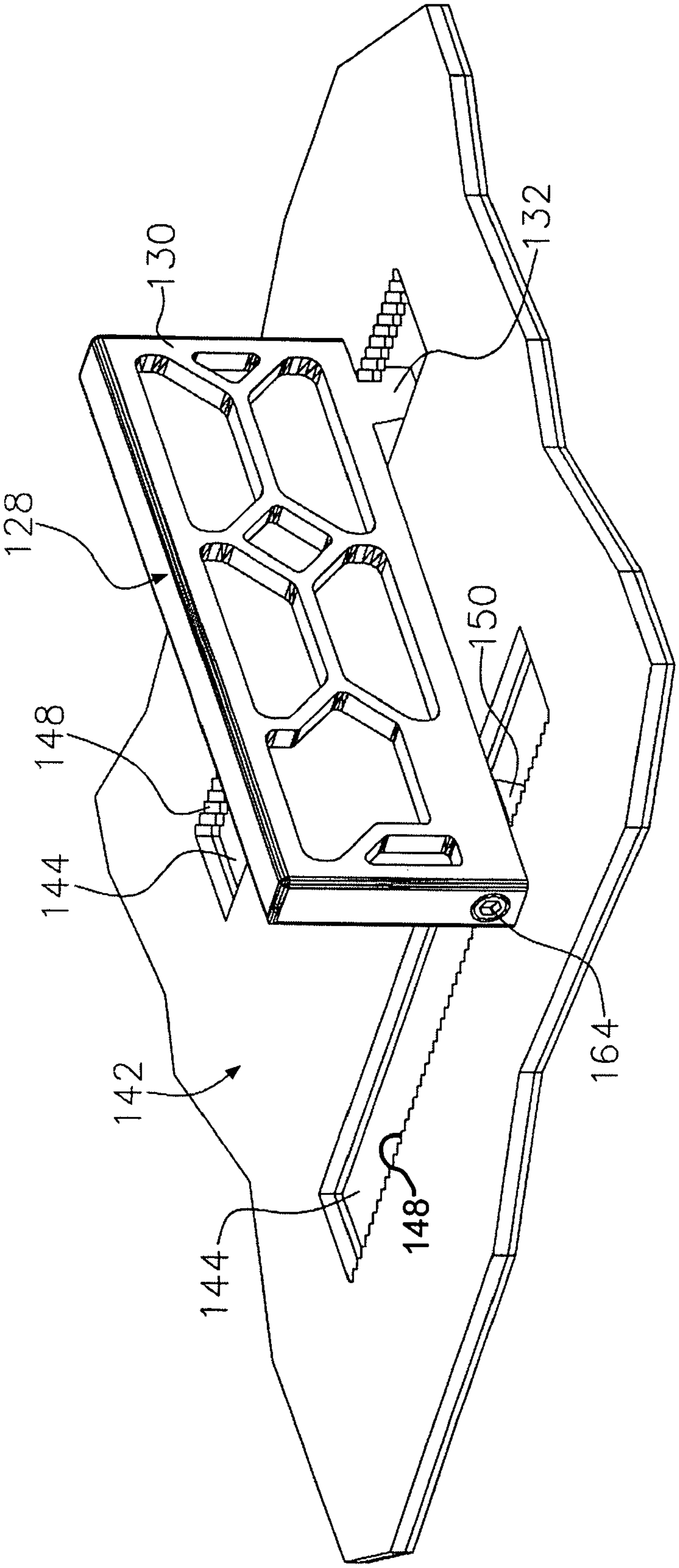
FIG. 17 is a perspective view of a guide member that can be used with the cart.
Figure 18:
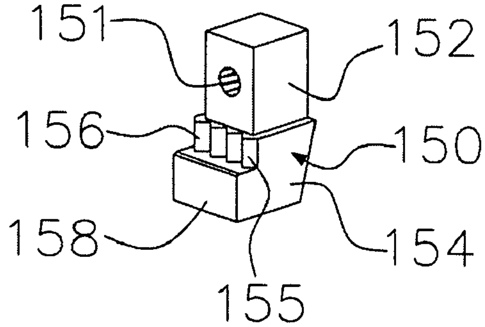
FIG. 18 is a partial perspective view of a slide lock that is used with the guide member of FIG. 17.
Figure 19:
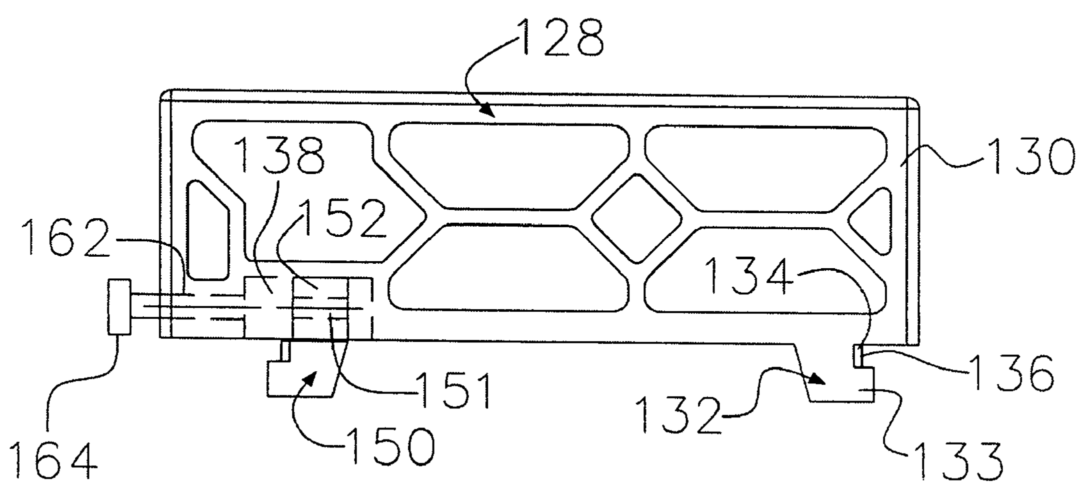
FIG. 19 is a side elevation view of the guide member shown in FIG. 17.

FIGS. 17–19 show another guide member 128 that can be used with the cart of the present invention. The guide member 128 is made from the same material and functions in essentially the same manner as the previously described guide members.

The guide member 128 has a divider section 130 that is positioned between objects positioned on the shelf assembly 142. Slots 144 are located in the shelf assembly 142 for positioning the guide member in the desired location on the shelf assembly 142. The slots 144 have a plurality of serrations or teeth 148 along one edge of the slots.

The guide member 128 has a foot 132 on one end that has a slot engaging surface 134 with a plurality of serrations or teeth 136 that are disposed to engage the teeth 148 in one of the slots 144. The foot 132 also has a tab 133 that extends from the end of the slot engaging surface 134. The tab 133 is designed to extend along the surface of the shelf assembly 142 that is opposite to the surface where the divider section 130 is positioned. The foot 132 is designed to fit through one of the slots 144 in the shelf assembly 142.

The other end of the guide member 128 has a slide lock 150 that is slideable positioned in the chamber 138 in the divider section 130. The slide lock 150 has a protrusion 152 that extends into and is slideably positioned in the chamber 138. A threaded aperture 151 is positioned in the protrusion 152. A locking foot 154 extends from the protrusion 152. The locking foot 154 has a slot engaging surface 155 with a plurality of serrations or teeth 156 and a tab 158 that is essentially the same as the tab 133 on the foot 132. The slot engaging surface 155 is disposed to engage the serrations or teeth 148 in one of the slots 144. The tab 158 is designed to extend along the surface of the shelf assembly 142 that is opposite to the surface where the divider section 130 is positioned. The locking foot 134 is designed to fit through the one of the slots 144 in the shelf assembly 142.

An aperture 162 is positioned on the end of the divider section 130 where the slide lock 150 is located. The aperture extends into the chamber 138 and is designed to be alignable with the threaded aperture 151 in the protrusion 152 of the slide lock 150. A threaded bolt 164 is positioned in the aperture 162 and threadingly engages the threaded aperture 151 in the protrusion 152.

In operation, the guide member 128 is positioned on the shelf assembly 142 with the foot 132 and slide lock 150 positioned in the slots 144. When the divider section 130 is in the desired location on the shelf assembly 142. The threaded bolt 164 is rotated to advance the slot engaging surface 155 of the slide lock 150 towards the teeth 148 in the slot 144 and to move the slot engaging surface 134 on the foot 132 into engagement with the teeth 148 on the other slot 144. The threaded bolt 164 is rotated to advance the protrusion 152 in the chamber 138 until the guide member 128 properly engages the slots 144 and is locked into position on the shelf assembly 142. The guide member 128 can be released by rotating the bolt 164 in the opposite direction to advance the slide lock 150 in the opposite direction to release the engagement with the slots 144.

Thus, it can be seen how the storage and transportation cart of the present invention is provided with flexibility in design to retain multiple sized parts of a variety of sizes and configurations in a single cart. The cart is capable of an infinite number of adjustments along three axes to assist in retaining multiple parts of varying shapes and sizes. Further, the identical nature of parts such as the base member 10 and roof member 11, the corner posts 13, the shelf assemblies 14 and the guide members 18 allow for easy replacement of parts due to damage or wear.

The above description of the preferred embodiment is extended to be illustrative in nature and is not intended to be limiting upon the scope and content of the following claims.

We claim:

1. A storage and transportation cart comprising in combination:

a base member;

a roof member spaced from the base member;

corner posts positioned between the roof member and base member, each corner post defining a plurality of stops along the length;

at least two shelf assemblies engaged with the plurality of stops on the corner posts and capable of movement between the corner posts along a first axis;

a plurality of guide members moveably positioned in opposed relationship to each other and retained by each shelf assembly, the guide members being spaced apart on each shelf assembly to provide a desired spacial orientation along a second axis, and the guide members being adjustable with respect to each other along the second axis, wherein the guide members can be used to separate and position various sized articles that are placed on the shelf assemblies of the cart, and a rear stop assembly positioned on at least one of the shelf assemblies, the rear stop assembly being adjustable along a third axis.

2. The cart of claim 1 further including a hinged retaining gate positioned on each shelf assembly across the guide members in opposition to the rear stop assembly.

3. The cart of claim 1 wherein the shelf assemblies include at least two slots disposed in substantially parallel relationship.

4. The cart of claim 3 wherein the guide members are moveably positioned in the slots to accommodate various sized articles that are positioned on the cart assembly.

5. The cart of claim 4 wherein the guide members include a spring clip that is designed to be biased against one of the slots in the shelf assembly to locate the guide members in the desired position on the shelf assembly.

6. The cart of claim 5 wherein the guide members include a retaining clip that engages the other slot on the shelf assembly.

7. The cart of claim 1 wherein the stop assembly is positioned on the middle of the shelf assembly so that articles can be positioned on both sides of the stop assembly.

8. The cart of claim 7 wherein a hinged retaining gate is positioned on each side of the shelf assembly to retain articles on the shelf assembly between the stop assembly and the hinged retaining gates.

9. The cart of claim 1 wherein the stop assembly is positioned in opposed relationship with the guide members on each shelf assembly.

10. The cart of claim 1 wherein the stop assembly has a bracket on each end that wraps around the edge of the shelf assembly, a securing means being positioned on the brackets to secure the stop assembly to the shelf assembly.

11. The cart of claim 10 wherein a stop member extends between the brackets, the stop member having a telescoping section that allows the stop assembly to be used on different width shelf assemblies.

12. The cart of claim 11 wherein the telescoping section is secured by a releasable latch mechanism to facilitate adjustment of the stop member.

13. The cart of claim 2 wherein the hinged retaining gate has a latch mechanism that secures the hinged retaining gate to the corner post when the hinged retaining gate is being utilized to secure articles on the cart assembly.

14. A storage and transportation cart comprising in combination:

a base member;

a roof member spaced from the base member;

corner posts positioned between the roof member and base member, each corner post defining a plurality of stops along the length;

at least two shelf assemblies engaged with the corner posts and capable of movement between the corner posts along a first axis;

at least two slots disposed in substantially parallel relationship on each shelf assembly;

a plurality of guide members positioned in opposition to each other and retained by each shelve assembly, the guide members being spaced apart on each shelf assembly to provide a desired spacial orientation along a second axis, and the guide members being adjustable with respect to each other along the second axis;

the guide members having a width and a thickness wherein the width is at least twice the thickness, a pair of spaced apart substantially parallel holes extend through the guide members in the width direction and in the thickness direction, the spaced apart holes being disposed to be in alignment with the slots in the shelf assembly whereby the guide members can be positioned on the shelf assembly in different orientations to provide different degrees of spacing.

15. The cart of claim 14 wherein a bolt is positioned in said the spaced apart holes and extends through the slots on the shelf assembly, a nut is positioned on the end of the bolt that extends from the slot to moveably secure the guide members to the shelf assembly.

16. The cart of claim 14 wherein a locking nut is secured to the end of the bolt that extends from the shelf assembly, the locking nut having a shoulder that is disposed to engage the surface of the shelf assembly when the locking nut is in a first position and pass through the slot in the shelf assembly when the locking nut is in a second position.

17. The cart of claim 16 wherein the locking nut includes a cam surface that engages the slot in the shelf assembly when the locking nut is in the first position to prevent further rotation of the locking nut whereby the bolt can be readily tightened to secure the guide member to the shelf assembly.

18. A storage and transportation cart comprising in combination:

a base member;

a roof member spaced from the base member;

corner posts positioned between the roof member and base member, each corner post defining a plurality of stops along the length;

at least two shelf assemblies engaged with the corner posts and capable of movement between the corner posts along a first axis;

at least two slots disposed in substantially parallel relationship on each shelf assembly;

a plurality of guide members positioned in opposition to each other and retained by each shelve assembly, the guide members being spaced apart on each shelf assembly to provide a desired spacial orientation along a second axis, and the guide members being adjustable with respect to each other along the second axis;

each guide member having a foot that extends from one end and a movable slide lock that extends from the other end, the foot and slide lock being disposed to extend through the slots on the shelf assembly to position the guide member with respect to the shelf assembly.

19. The cart of claim 18 wherein the moveable slide lock can be advanced to position the slide lock and foot in engagement with the slots in the shelf assembly to secure the guide members to the shelf assembly.

20. The cart of claim 19 wherein the slots in the shelf assembly have a plurality of teeth along one edge and the foot and slide lock have a plurality of teeth that are disposed to engage the teeth on the slots whereby the guide members are securely held in position on the shelf assembly when the slide lock has been advanced to position the foot and slide lock in engagement with the edge of the slots having a plurality of teeth.

21. A storage and transportation cart comprising in combination:

a base member;

a roof member spaced from the base member;

corner posts positioned between the roof member and base member, each corner post defining a plurality of stops along the length;

at least two shelf assemblies engaged with the corner posts and capable of movement between the corner posts along a first axis; each shelf assembly having two opposed substantially parallel slots;

a plurality of guide members positioned in opposition to each other and retained by each shelve assembly, the guide members being spaced apart on each shelf assembly to provide a desired spacial orientation along a second axis, and the guide members being adjustable with respect to each other along the second axis; and a rear stop assembly moveably positioned in the slots on at least one of the shelf assemblies, the rear stop assembly being adjustable along a third axis.

each shelf assembly has two opposed substantially parallel slots, the stop assembly being moveably positioned in the slots.

22. A storage and transportation cart comprising in combination:

a base member;

a roof member spaced from the base member;

corner posts positioned between the roof member and base member, each corner post defining a plurality of stops along the length;

at least two shelf assemblies engaged with the corner posts and capable of movement between the corner posts along a first axis;

each of the shelf assemblies having a cut out area;

at least two slots disposed in substantially parallel relationship on each shelf assembly; the slots being formed by an insert that is secured to the shelf assembly, the insert being secured to shelf assembly in the area of the cut out, the insert containing the slots; and a plurality of guide members positioned in opposition to each other and retained by each shelve assembly, the guide members being spaced apart on each shelf assembly to provide a desired spacial orientation along a second axis, and the guide members being adjustable with respect to each other along the second axis, the slots in the shelf assemblies are formed by an insert that is secured to the shelf assembly, the shelf assembly having a cut out and the insert being secured to the shelf assembly in the area of the cut out, the insert containing the slots.

23. The cart of claim 22 wherein the insert reinforces the shelf assembly in the area of the slots.

* * * * *